(12) United States Patent
Van Hoof

(10) Patent No.: US 7,949,950 B2
(45) Date of Patent: May 24, 2011

(54) SYSTEMS AND METHODS FOR ENHANCED DOCUMENT COMPOSITION FEATURES

(75) Inventor: Hubert Van Hoof, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 679 days.

(21) Appl. No.: 11/112,981

(22) Filed: Apr. 22, 2005

(65) Prior Publication Data

US 2006/0238795 A1    Oct. 26, 2006

(51) Int. Cl.
*G06F 17/00* (2006.01)

(52) U.S. Cl. ........ 715/251; 715/210; 715/209; 715/764; 358/1.18; 358/402; 358/438; 358/440; 358/452

(58) Field of Classification Search .......... 715/513–516, 715/764; 358/1.18, 402, 438, 440, 462
See application file for complete search history.

(56) References Cited

U.S. PATENT DOCUMENTS

| | | | | |
|---|---|---|---|---|
| 5,539,530 A * | 7/1996 | Reifman et al. | ............ | 358/402 |
| 5,715,069 A * | 2/1998 | Hersee et al. | ............ | 358/438 |
| 5,751,287 A * | 5/1998 | Hahn et al. | ............ | 715/775 |
| 6,175,428 B1 * | 1/2001 | On et al. | ............ | 358/406 |
| 6,236,471 B1 * | 5/2001 | Lee | ............ | 358/474 |
| 6,654,737 B1 * | 11/2003 | Nunez | ............ | 707/3 |
| 2002/0175958 A1 * | 11/2002 | Natori | ............ | 347/5 |
| 2003/0133142 A1 * | 7/2003 | Miyata | ............ | 358/1.13 |
| 2003/0225662 A1 * | 12/2003 | Horan et al. | ............ | 705/36 |
| 2005/0188306 A1 * | 8/2005 | Mackenzie | ............ | 715/530 |
| 2005/0237557 A1 * | 10/2005 | Ferlitsch | ............ | 358/1.13 |
| 2005/0283735 A1 * | 12/2005 | Ferlitsch et al. | ............ | 715/771 |
| 2006/0209333 A1 * | 9/2006 | Takida | ............ | 358/1.15 |
| 2006/0271936 A1 * | 11/2006 | Matsuda et al. | ............ | 718/102 |

OTHER PUBLICATIONS

Poremsky, Diane, Sams Teach Yourself Microsoft® Office Outlook® 2003 in 24 Hours, Pub Date: Sep. 12, 2003, Publisher: Sams, pp. 1-10.*
Adobe Acrobat 7.0 Professional, Jan. 5, 2005, Adobe, pp. 1-8.*
Edge et al., What is TIFF?, Aug. 18, 2001, WhatIs.com, Definition, p. 1.*

* cited by examiner

*Primary Examiner* — Doug Hutton
*Assistant Examiner* — Nathan Hillery
(74) *Attorney, Agent, or Firm* — Lee & Hayes, PLLC

(57) ABSTRACT

Systems and methods for enhanced document composition features which can be utilized by a user are described. One method imports user-selected pages into a digital document platform. The method protects content of individual pages while allowing pages to be moved relative to one another and allows new content to be added between the user-selected pages.

15 Claims, 13 Drawing Sheets

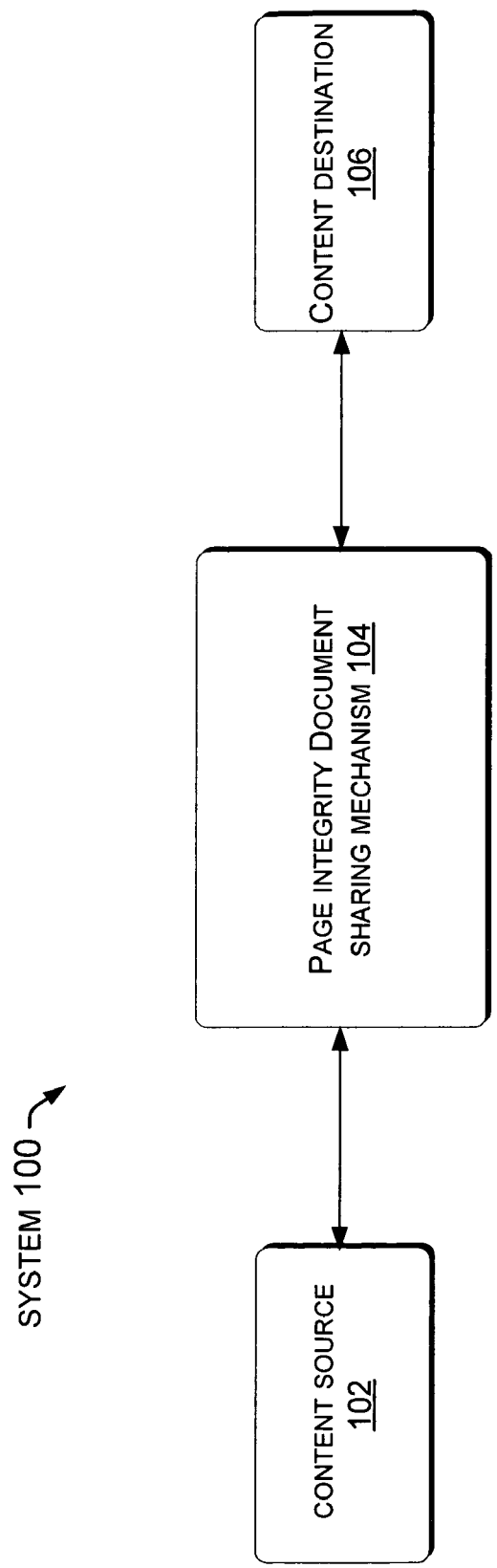

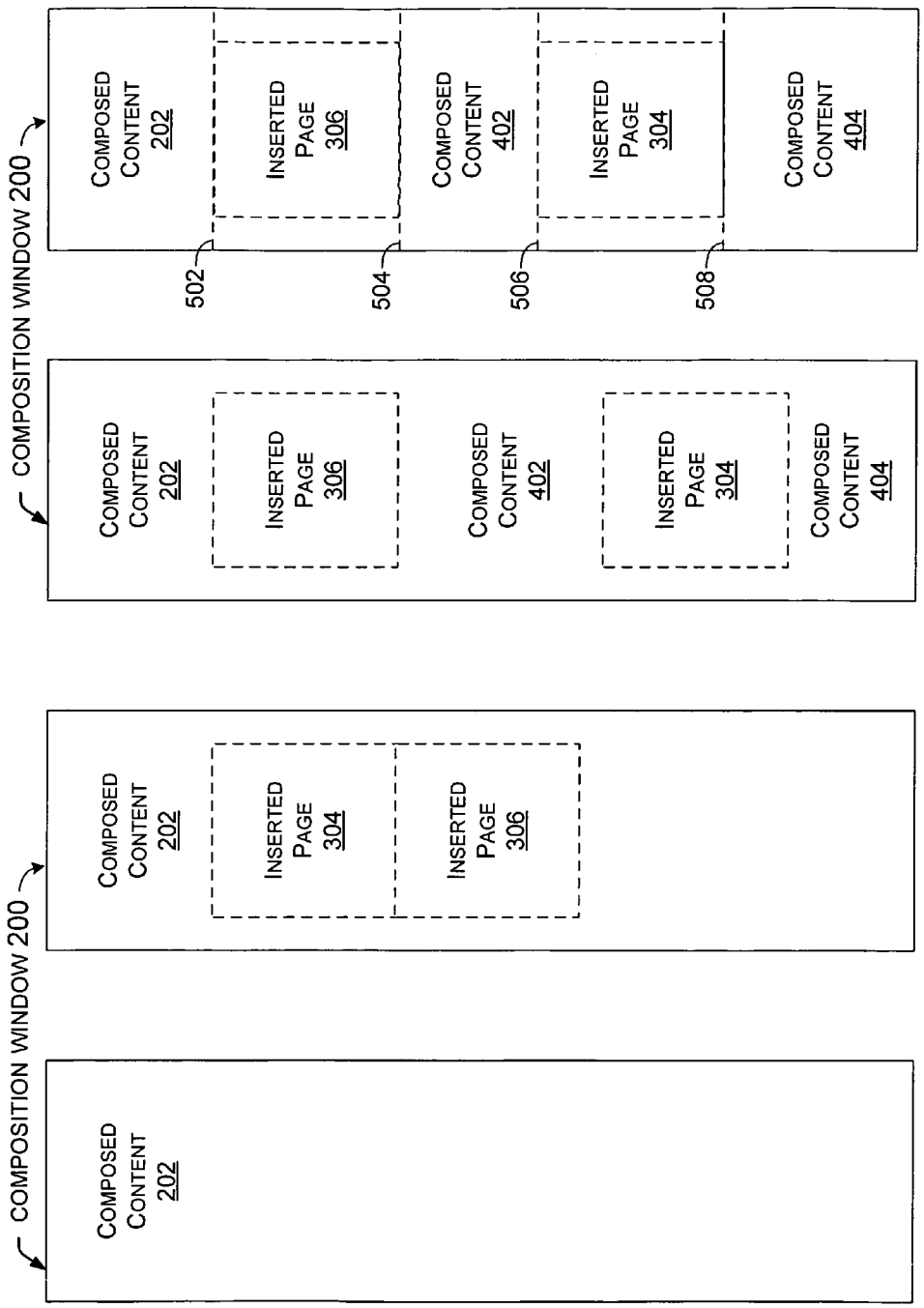

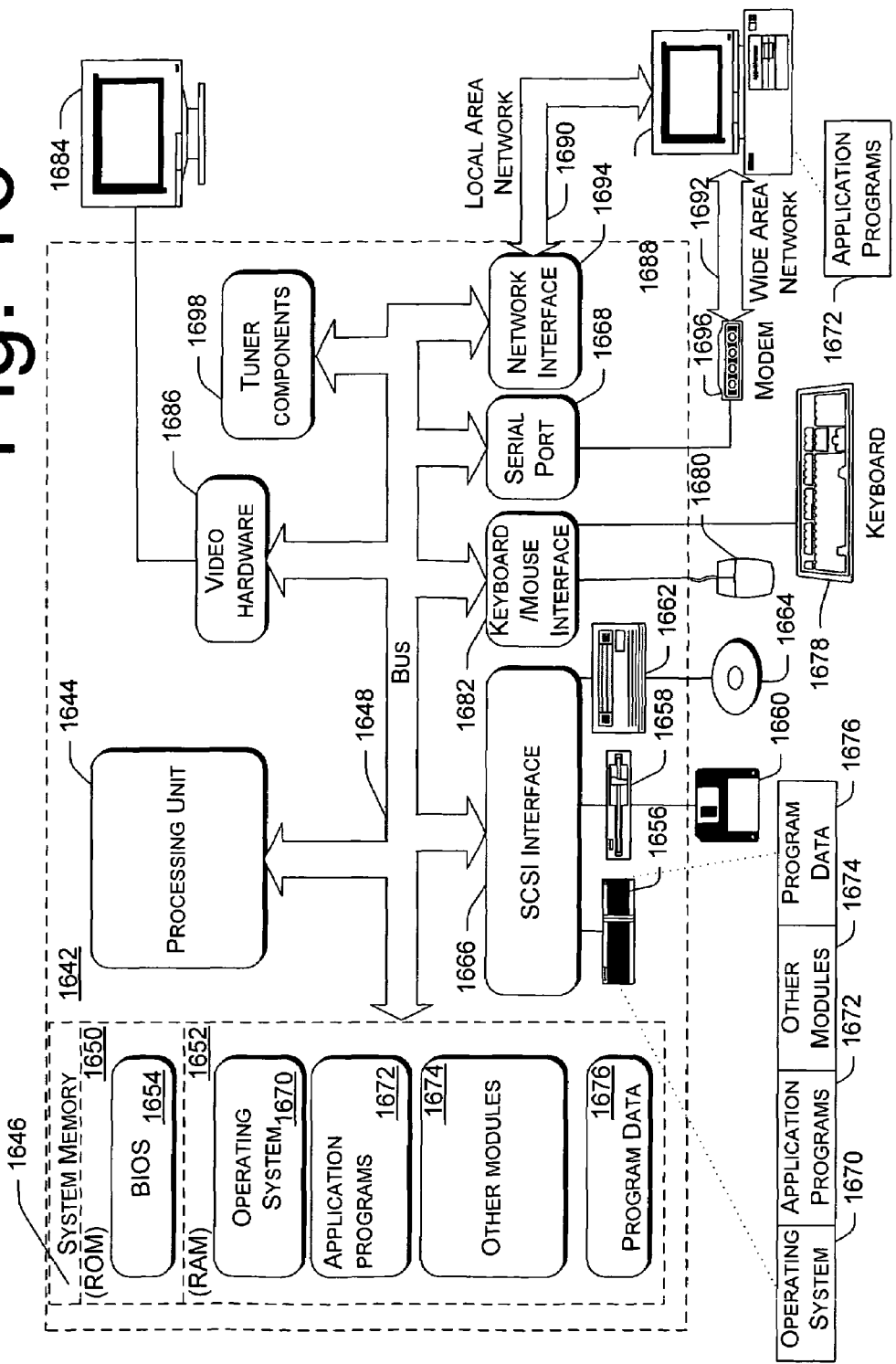

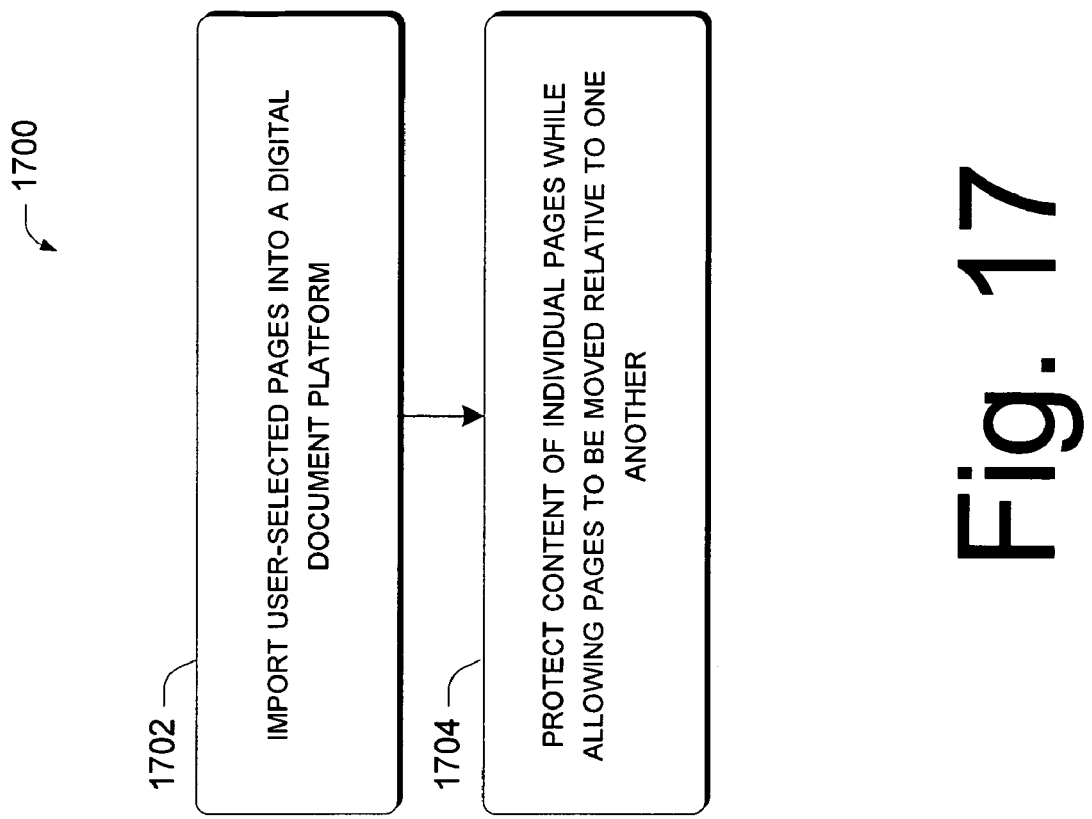

SYSTEMS AND METHODS FOR ENHANCED DOCUMENT COMPOSITION FEATURES

TECHNICAL FIELD

The invention pertains to systems and methods for document composition.

BACKGROUND

Document composition on a computer is an everyday experience for knowledge workers and much of society at large. Computer users desire to have as many options available as possible during the composition process. For instance, often computer users desire to incorporate content from other sources with the document. Presently, the computer user is limited in how content can be incorporated with the document. As such, a need exists for enhanced document composition features which allow a user to incorporate content during composition of a document.

SUMMARY

Systems and methods for enhanced document composition features which can be utilized by a user are described. One method imports user-selected pages into a digital document platform. The method protects content of individual pages while allowing pages to be moved relative to one another and allows new content to be added between the user-selected pages.

BRIEF DESCRIPTION OF THE DRAWINGS

FIG. 1 illustrates a system supporting enhanced document composition features, in accordance with one embodiment.

FIGS. 2-5 illustrate representations of a composition window providing enhanced document composition features, in accordance with one embodiment.

FIG. 16 illustrates exemplary systems, devices, and components in an operating environment, in accordance with one embodiment.

FIG. 17 illustrates an exemplary process diagram for supporting enhanced document composition features, in accordance with one embodiment.

DETAILED DESCRIPTION

Overview

Figure 6:
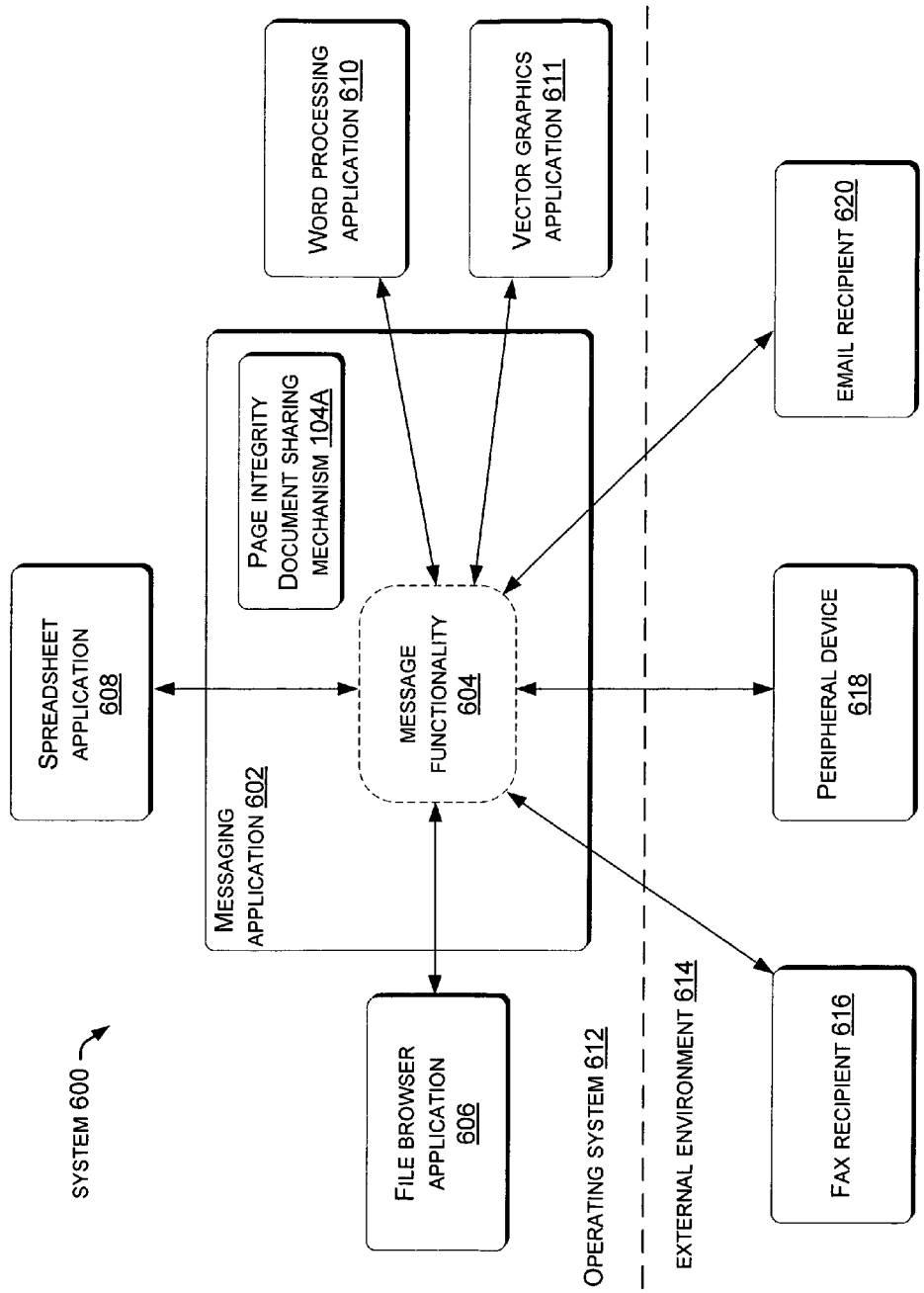
FIG. 6 illustrates a system supporting enhanced document composition features, in accordance with one embodiment.

The following description relates to systems and methods for enabling a user to import pages of content into a destination such that the integrity of individual pages (hereinafter "imported inline pages") is maintained while allowing inter-page manipulation.

Consider FIG. 1 as an example of a system 100 for maintaining page integrity of imported inline pages. System 100 includes a content source 102, a page integrity document sharing mechanism 104, and a content destination 106. The content source may be a native application, file browser, or hardware device, among others, from which the pages of content can be obtained. The content destination may be any application with which a user can interact during a composition process or experience. Composition processes are encountered in, for instance, messaging applications such as email and/or fax applications, among others.

System 100 is configured to allow a user to select pages of content from the content source 102 to be imported to the content destination 106. The page integrity document sharing mechanism 104 and the content destination 106 serve to create a digital document platform to which pages of content can be imported. The integrity of individual imported inline pages is protected while otherwise allowing a rich composition experience. For instance, the system is configured to allow the user to add content between the imported inline pages and/or to manipulate the relative order of the imported inline pages. For purposes of explanation, page integrity document sharing mechanism 104 is illustrated as a discrete component, however, in various implementations, the page integrity document sharing mechanism may operate as a sub-component or functionality of another system component. For instance, the page integrity document sharing mechanism may operate as a sub-component or module of the content destination.

FIGS. 2-5 collectively provide an example of a composition window 200 in which a user can have a rich composition experience while the content of individual imported inline pages is protected. Referring now to FIG. 2, the user can compose content in the composition window 200 as indicated generally as composed content 202. Examples of composing content can include, for instance, typing on a keyboard, drag-and-dropping text, images or graphics and/or cutting-and-pasting among others.

Referring now to FIG. 3, the user can import pages of content into composition window 200 as imported inline pages 304, 306. The pages to be imported can comprise an entire document or file or a sub-set of a file. In the illustrated sequence, the pages are imported after the user composes content, but this is but one example, and in other scenarios the pages may be imported prior the user composing content. The content of the individual imported inline pages 304, 306 is inline with the composed content and is visible to the user in composition window 200, but the user cannot manipulate content of the individual imported inline pages. As such, the user can easily read and reference the content of the imported inline pages without any risk of the content being changed.

Alternatively or additionally, and as illustrated in FIG. 4, the user may also manipulate the inter-relationship of the imported inline pages. Stated another way, the user can move individual imported inline pages around during the composition experience. For instance, in FIG. 4 the user has reversed the relative relationship of imported inline pages 304 and 306 so that imported inline page 306 now precedes imported inline page 304 in composition window 200. Additional composed content 402, 404 has also been added between imported inline pages 306 and 304 and following imported inline page 304, respectively.

FIG. 5 illustrates a page preview mode including indicated page breaks 502, 504, 506, and 508. In this particular implementation, individual imported inline pages begin and end with a page break independent of the length of the composed content. For instance, composed content 402 may occupy less than a full physical page, but imported inline page 304 begins with a page break nonetheless.

Several exemplary implementations are described in more detail below in a message composition context, such as may be encountered in fax and/or email scenarios, among others. The exemplary implementations allow a user to import pages of content into a message composition destination. The integrity of the content of individual imported inline pages is maintained during message composition while the user is allowed to manipulate the inter-page relationship of the imported pages.

Exemplary Embodiments

FIG. 6 illustrates an example of a system 600 in which pages of content can be imported into a messaging scenario. In this particular system configuration a message scenario can include fax, email, and/or instant messaging, among others. System 600 includes a messaging application 602 which, at least in part, accomplishes a messaging functionality 604 which is described in more detail below by way of example. Messaging application 602 also includes, or is in communication with, page integrity document sharing mechanism 104A. In this particular instance, the page integrity document sharing mechanism is a software module which operates in cooperation with the messaging application 602.

System 600 also includes, by means of non-limiting example, a file browser application 606, a spreadsheet application 608, a word processing application 610, and a vector graphics application 611, which along with messaging application 602 operate in cooperation with an operating system 612 to generate a user-interface. System 600 also includes, in an external environment 614, and by means of non-limiting example, a fax recipient 616, a peripheral device 618, and an email recipient 620 communicating with the message functionality 602 via the operating system 612.

System 600 is configured so that as a part of the message functionality a user can invoke a message composition window. If the user requests to import inline pages of content into the message composition window, the page integrity document sharing mechanism 104A accesses the pages. In some instances the pages are accessed from peripheral device 618, such as a scanner. In other instances the pages are accessed by calling a native application in which the pages where created. For instance, assume that the user wants to import a word processing document or file, the page integrity document sharing mechanism 104A calls the word processing application 610. Depending on the native format, the page integrity document sharing mechanism further causes the document to be processed so that individual pages of the file as they appear inline in the message composition window cannot be altered by the user. For instance, if the document is an object oriented image such as is commonly utilized with word processing applications, then the page integrity document sharing mechanism 104A causes the file to be rasterized, or otherwise converted into a bit-map format, prior to being imported into the message composition window. If the document is already in a bit-map format it can be imported without further processing. This is particularly useful, but not limited to, fax composition scenarios.

In some configurations, document rasterization is conducted by the page integrity document sharing mechanism 104A. In other configurations the page integrity document sharing mechanism causes other components to rasterize the file. For instance, the page integrity document sharing mechanism 104A may cause a print driver (not specifically designated) to rasterize the document into a bit-map format. The bit-map pages may be stored in any suitable format such as tagged image file format (TIFF), bit-mapped graphic (BMP), PCX, and others. Individual bit-mapped imported inline pages are protected from user alteration, but are visible to the user and otherwise allow a rich composition experience for the user in the message composition window. Individual bit-mapped imported inline pages are protected from user alteration such that the content of an individual page cannot be manipulated by the user. The user can however, see and move individual imported inline pages during the composition process.

The implementations described above and below are described in the context of a computing environment as commonly encountered at the present point in time. Various examples can be implemented by computer-executable instructions or code means, such as program modules, that are executed by a computer, such as a personal computer (PC). Generally, program modules include routines, programs, objects, components, data structures and the like that perform particular tasks or implement particular abstract data types.

Various examples may be implemented in computer system configurations other than a PC. For example, various embodiments may be realized in Apple Macintosh computers, tablet PCs, hand-held devices, multi-processor systems, microprocessor-based or programmable consumer electronics, network PCs, minicomputers, mainframe computers, cell phones, and the like. Further, as technology continues to evolve, various implementations may be realized on yet to be identified classes of devices.

Various examples may be practiced in distributed computing environments, where tasks are performed by remote processing devices that are linked through a communications network. In a distributed computing environment, program modules may be located in both local and remote memory storage devices.

Although the various implementations may be incorporated into many types of operating environments as suggested above, a description of but one exemplary environment appears in FIG. 16 in the context of an exemplary general-purpose computing device and which is described in more detail later in this document under the heading "Exemplary Operating Environment".

For purposes of explanation and by way of example, more detailed descriptions of various components and functionalities are described below in relation to the Windows® operating system offered by Microsoft® Corporation and also in relation to various applications, such as Explorer® brand file browser application and Outlook® brand messaging application, offered by Microsoft Corporation. The Windows operating system and associated applications are widely recognized, and as such provide a suitable platform for explanation. The skilled artisan should recognize other suitable operating systems and/or applications consistent with the discussion provided above and below.

Figure 7:
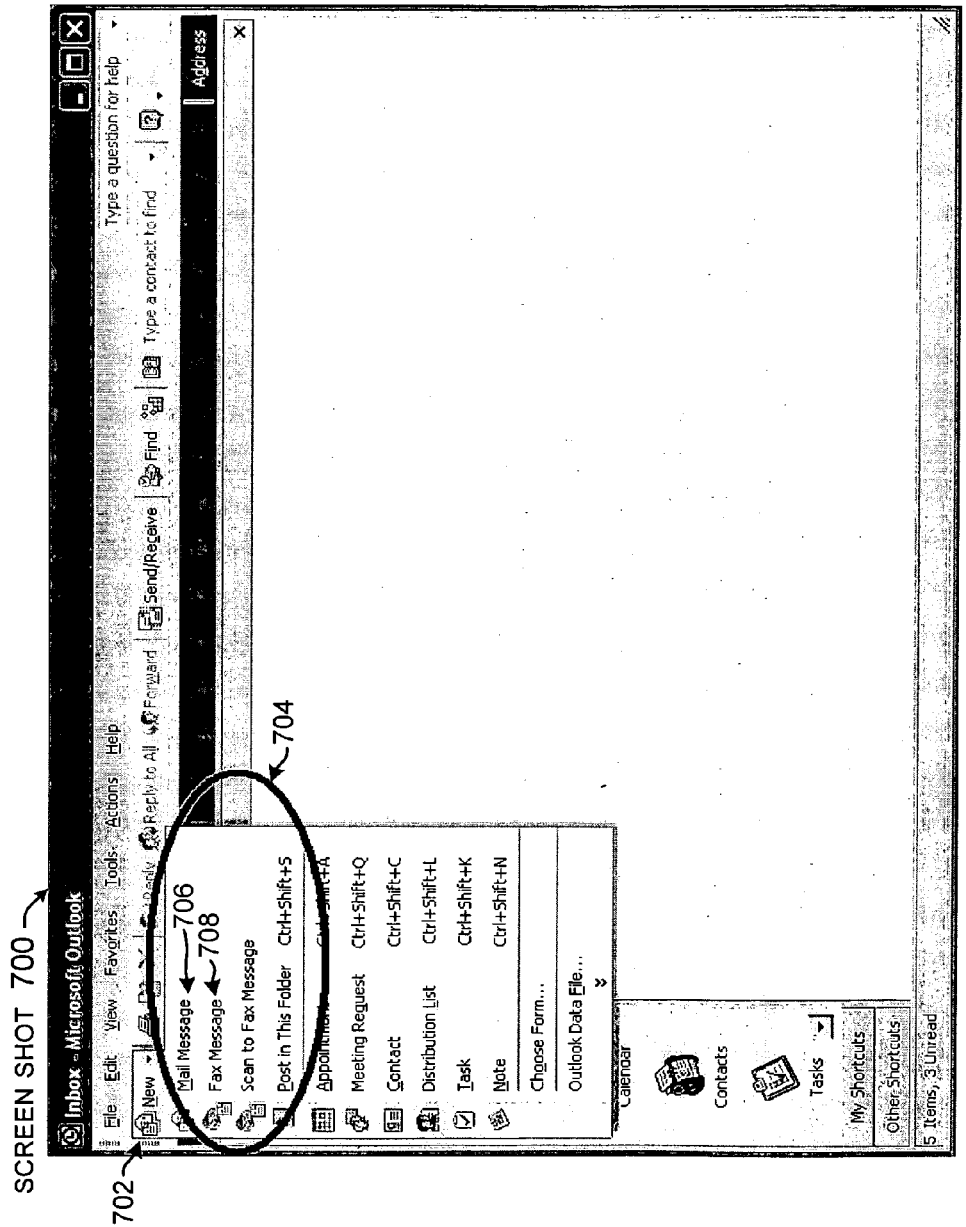
FIGS. 7-15 illustrate representations of screenshots providing enhanced document composition features, in accordance with one embodiment.

FIG. 7 illustrates a screenshot 700 which shows but one example of how a user may launch a message composition window and imported inline pages. Screenshot 700 illustrates a unified messaging application in the form of the Windows® Outlook® brand messaging application. In this particular implementation a fax functionality and an email functionality are unified as an overall messaging application. A unified messaging application can enable a user to utilize more than one message type. For example, the unified messaging application may allow the user to send and/or receive email, faxes, and/or instant messaging from a unified client interface. In this instance, a user can access a fax functionality and/or an email functionality through the unified Outlook-brand messaging application in several ways. For instance, the user may click on the 'New' heading/icon indicated at 702. One or more composition options indicated generally at 704 may appear on the list of options provided to the user. In this particular instance, the user may choose from a 'Mail Message' 706, or 'Fax Message' 708. Either of these options can allow the user to cause a message composition window to be generated.

Figure 8:
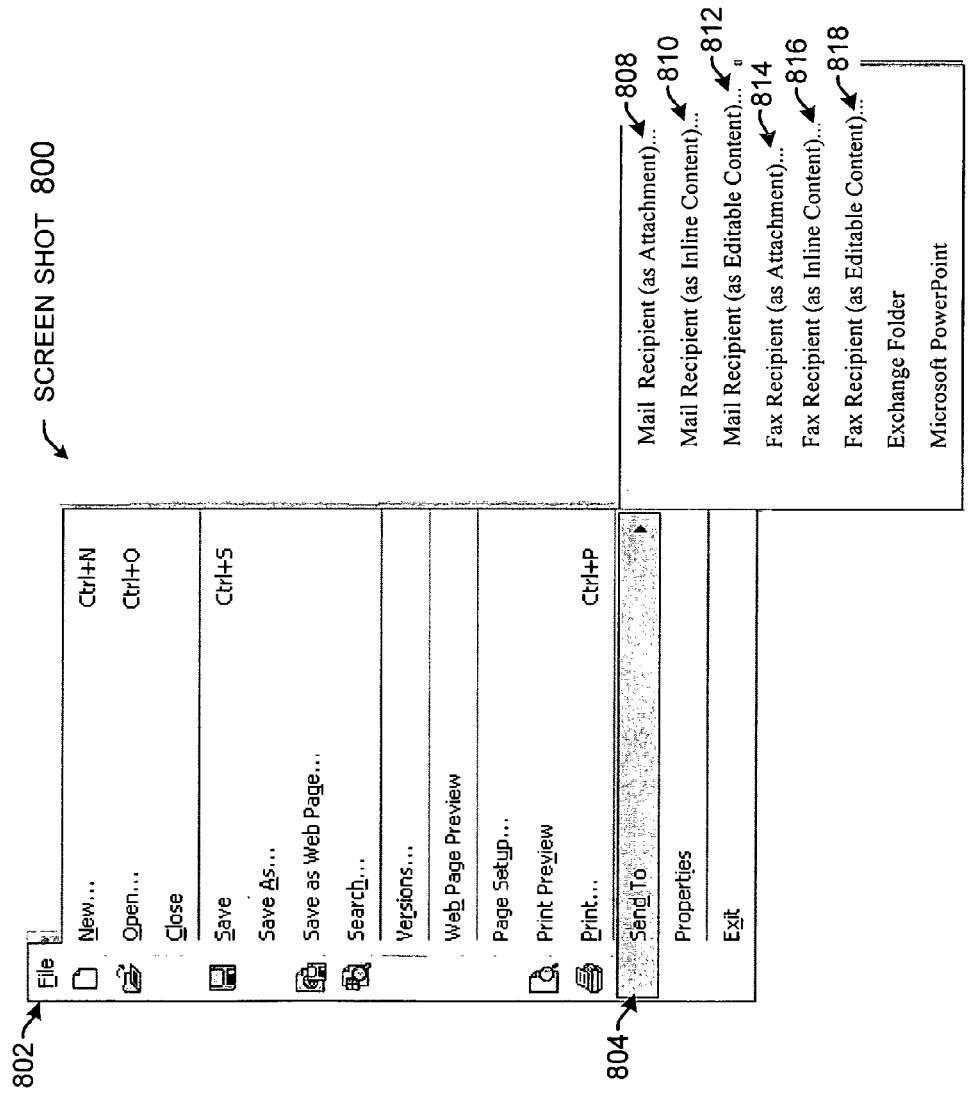

FIG. 8 illustrates another example of how a user can import inline pages into a message composition window from a file. In this instance, screenshot 800 allows the user to click on the 'File' heading/icon 802. A 'Send To' option indicated at 804 is one of the options provided within the 'File' heading/icon. The 'Send To' option includes several possible configurations and destinations which can be selected by the user. For instance, the user can select from 'Mail recipient (as attachment)' as indicated at 808, 'Mail recipient (as inline content)' 810, 'Mail recipient (as editable content)' 812, 'Fax recipient (as attachment)' as indicated at 814, 'Fax recipient (as inline content)' 816, or 'Fax recipient (as editable content)' 818. Selecting any one of these options will send the designated file to a fax recipient or email recipient in the specified configuration. Inline content is described above and below in relation to imported inline pages. Attachments and editable content are described in more detail below by way of example.

Figure 9:
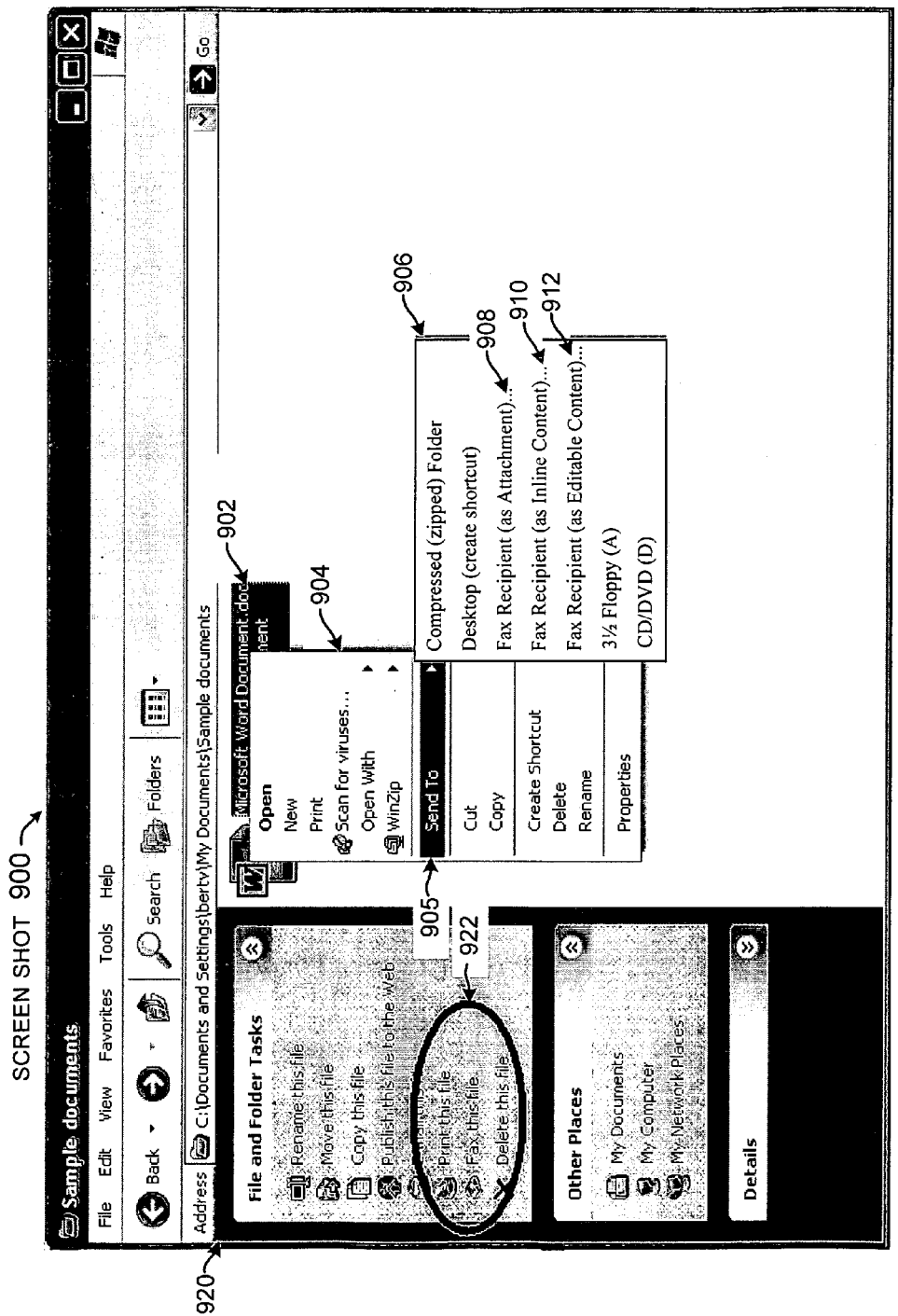

FIG. 9 illustrates a screenshot 900 which provides another example of how a user may import pages into a message composition, such as a fax message. Screenshot 900 may be encountered utilizing a file browser application such as a Windows® Explorer® brand file browser application. In this instance, the user utilizes the browser application to locate a file that the user wishes to fax. Once the file is located, the browser application offers the user several access points to the fax functionality. As a first option, the user can right-click on the file's icon 902. Responsive to the user right-clicking on the icon, a context menu 904 is generated. The user can select a 'Send to' command 905 which causes a second context menu 906 to be generated. From the second context menu the user can select how the user desires the file to be associated with the composition experience. For instance, the user can select from 'Fax Recipient (as attachment)' as indicated at 908, Fax Recipient (as inline content) 910, or Fax Recipient (as editable content) 912.

Alternatively, the user can select from the 'File and Folder Tasks' 920 a 'Fax this file' command at 922. Selection of the 'Fax this file' command can produce a further selection window, which though not specifically illustrated, can provide options similar to those described above. Namely, the selection window can allow the user to select from options such as 'Fax recipient (as attachment)', 'Fax recipient (as inline content)', or 'Fax recipient (as editable content)'.

Figure 10:
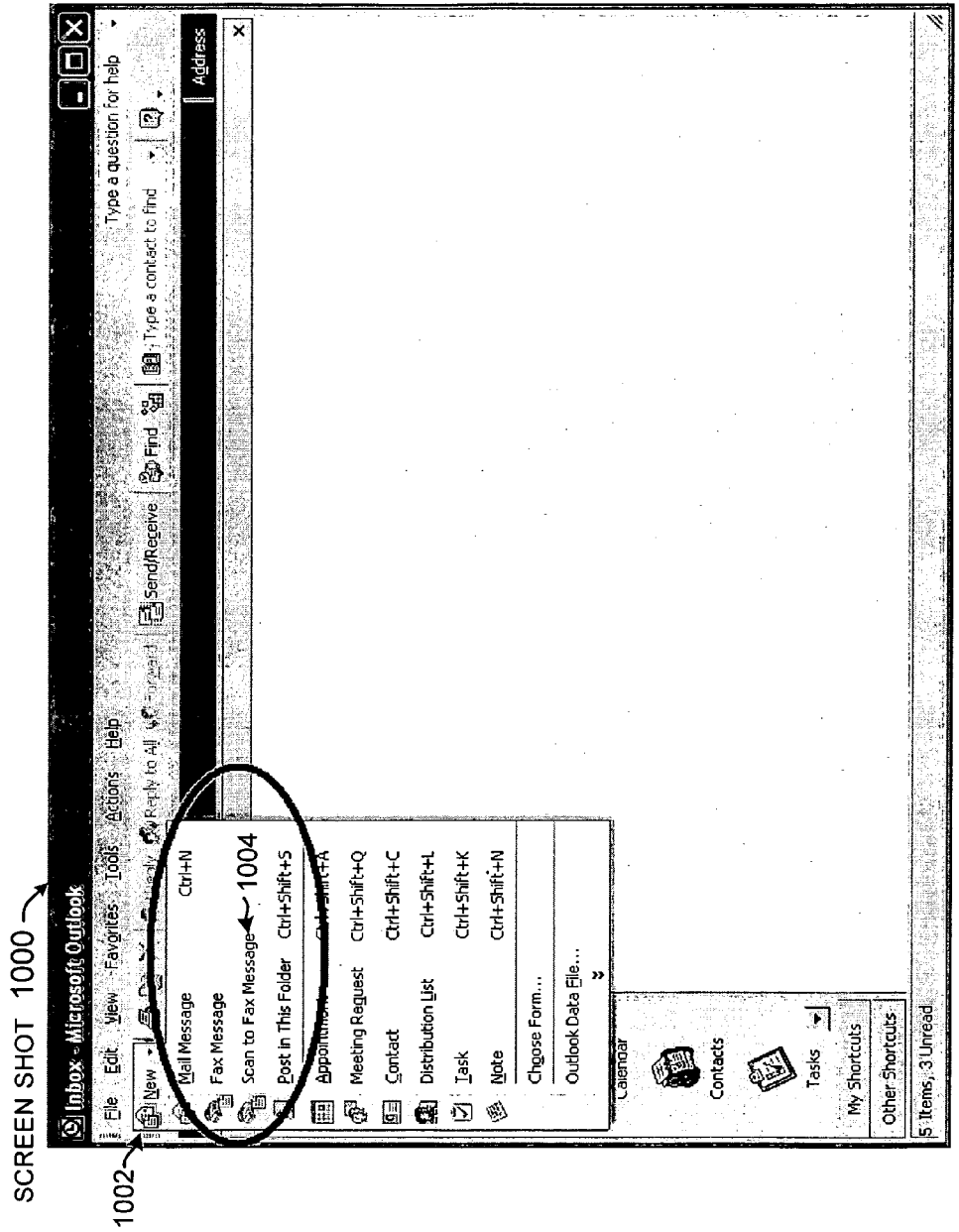

FIG. 10 illustrates a screenshot 1000 which represents another technique in which pages can be imported into a message composition window. This particular example is provided in the context of importing the pages into a fax composition window. Screenshot 1000 allows a user to select new icon 1002 which produces a dropdown list from which a user can select 'Scan to Fax Message' 1004. Selecting the 'Scan to Fax Message' option allows the user to import pages from a peripheral device such as a dedicated scanner or a multi-function peripheral (MFP) having scanning capabilities. The fax application may, by default, import the scanned pages as imported inline pages so that the content is imported with a single user action. Alternatively, the user may be queried as to a desired configuration. For instance, upon clicking 'Scan to Fax Message' 1004, a subsequent screen may be generated which queries the user for further information. For example, the screen may request the user to select from scanning as inline pages, scanning as an attachment, or scanning as editable text.

Figure 11:
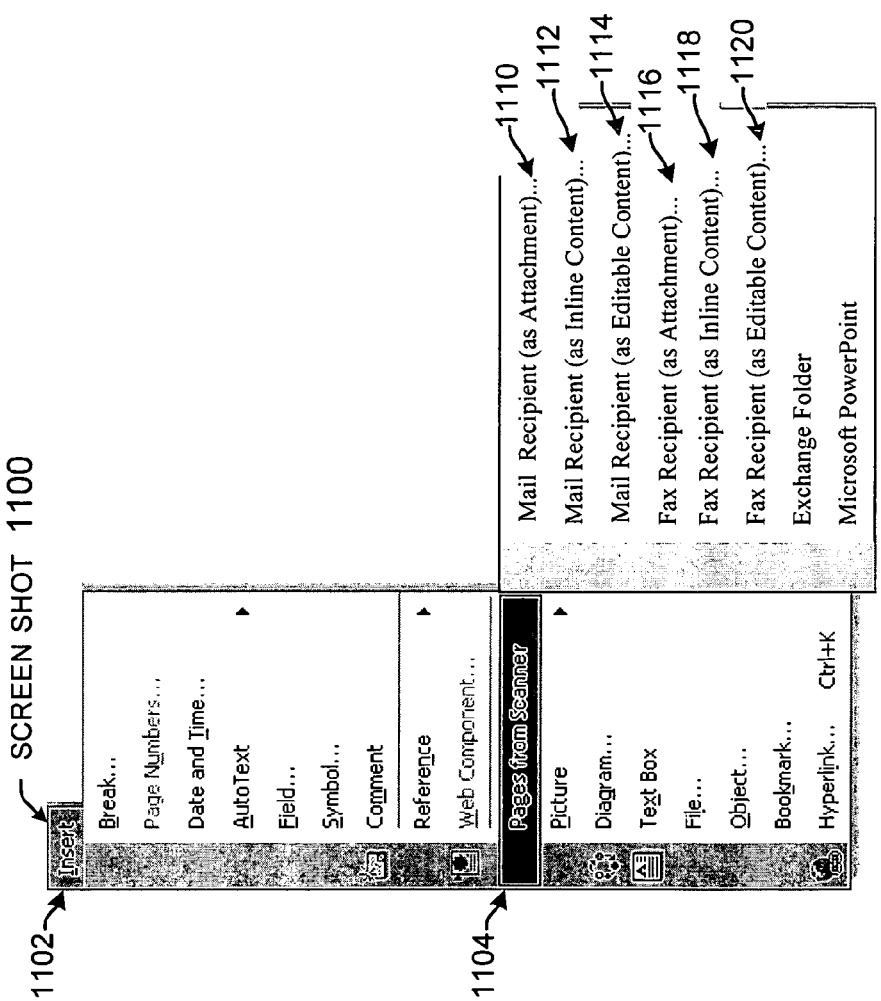

FIG. 11 illustrates a further screenshot 1100 which allows a user to select an insert command 1102 which causes a dropdown menu to be generated. The user can select 'Pages from Scanner' 1104 which produces further options for the user. The user can select from options such as 'Mail Recipient (as Attachment)' 1110, 'Mail Recipient (as Inline Content)' 1112, 'Mail Recipient (as Editable Content)' 1114, 'Fax Recipient (as Attachment)' 1116, 'Fax Recipient (as Inline Content)' 1118, or 'Fax Recipient (as Editable Content)' 1120.

Assume for purposes of explanation that a user positions a document on a scanning device and selects 'Fax Recipient (as Inline Content)' 1118. Responsive to the user selection, the document is automatically scanned and a fax application is launched. A fax composition window is generated for the user with the pages of the scanned document pre-populated in the fax composition window as will be described in more detail below in relation to FIG. 12.

Figure 12:
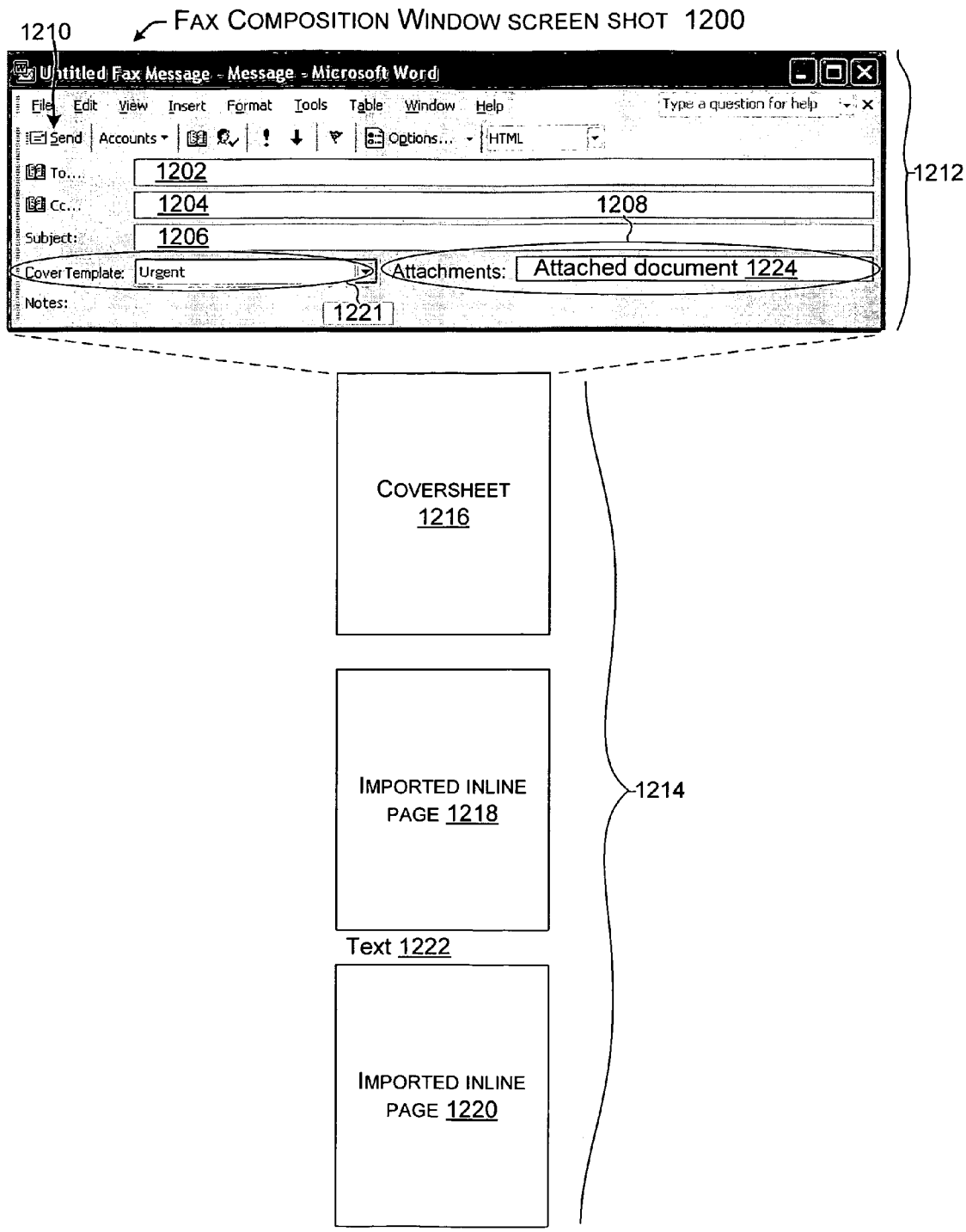

FIG. 12 illustrates a message composition window which, in this instance, comprises a screenshot of a fax composition window 1200. The fax composition window 1200 can include various fields and allow various user commands, only some of which are mentioned here with specificity. In this particular configuration, the fax composition window has a 'To' field 1202, a 'Cc' field 1204, a 'Subject' field 1206, an 'Attachments' field 1208, and includes various command tools including 'Send' 1210. While not described in this example, some implementations support a blind courtesy copy (Bcc) field and associated functionality.

The 'To' field, 'Cc' field, 'Subject' field, 'Attachments' field, and 'Send' are located in a header portion 1212 of the fax composition window 1200. Shown below the header portion 1212 are several pages of content indicated generally as a body 1214. The body 1214 is shown in reduced size relative to the header 1212 due to the physical constraints of the printed page upon which FIG. 12 appears. In this illustrated example, the body 1214 includes a cover page or coversheet 1216 and two imported inline pages 1218, 1220 obtained from the scanner as mentioned above in relation to FIG. 11.

In this instance, the coversheet 1216 is automatically generated by the fax application as the first page of the composition window's body 1214. In such an implementation, generation of the coversheet may be determined by the user, such as when setting up a fax account for the user. In some other configurations, the user decides whether to include a coversheet on a case-by-case basis. At least some implementations may include a list of built-in coversheets that a user can pick from. Alternatively to a built in coversheet, users can create their own customized coversheet at any time. Some of these implementations come with a coversheet editor that utilizes metadata fields from the fax message. This allows dynamic population of the content of the coversheet based on the metadata of the message that is already determined elsewhere in the user-interface (subject, sender, recipient etc.).

A coversheet can be selected for every message, such as by utilizing a cover template tool 1221. A default coversheet can be associated with a user's account for convenience reasons. That way if the user tends to use the same coversheet most of the time the user does not have to select the coversheet every time. This provides still another example of how the present embodiments can enhance the user experience and reduce user steps to send a fax message.

The imported inline pages 1218 and 1220 are positioned inline in the body 1214 following the coversheet 1216. By being inline in the body of the composition window, the imported inline pages 1218, 1220 are visible to the user during the composition experience. The user is prevented from adding, deleting, or otherwise manipulating content on the imported inline pages, but otherwise the user can be provided with a rich fax composition experience. For instance, assume further, that the user wishes to add some text 1222 in the body 1214 explaining the content of imported inline page 1220. In this instance, the user wants to add the text between the imported pages so that it is proximate to, but precedes, imported page 1220. This implementation allows the user to add the text 1222 as desired. Text 1222 can be cut, pasted, and otherwise edited.

In contrast to the imported inline pages, assume for purposes of explanation that the user desires to import a second different document as an attachment which is indicated generally as attached document 1224. The attached document is listed in attachments field 1208 during the composition process and its pages and/or contents are not visible to the user during the composition process.

Figure 13:
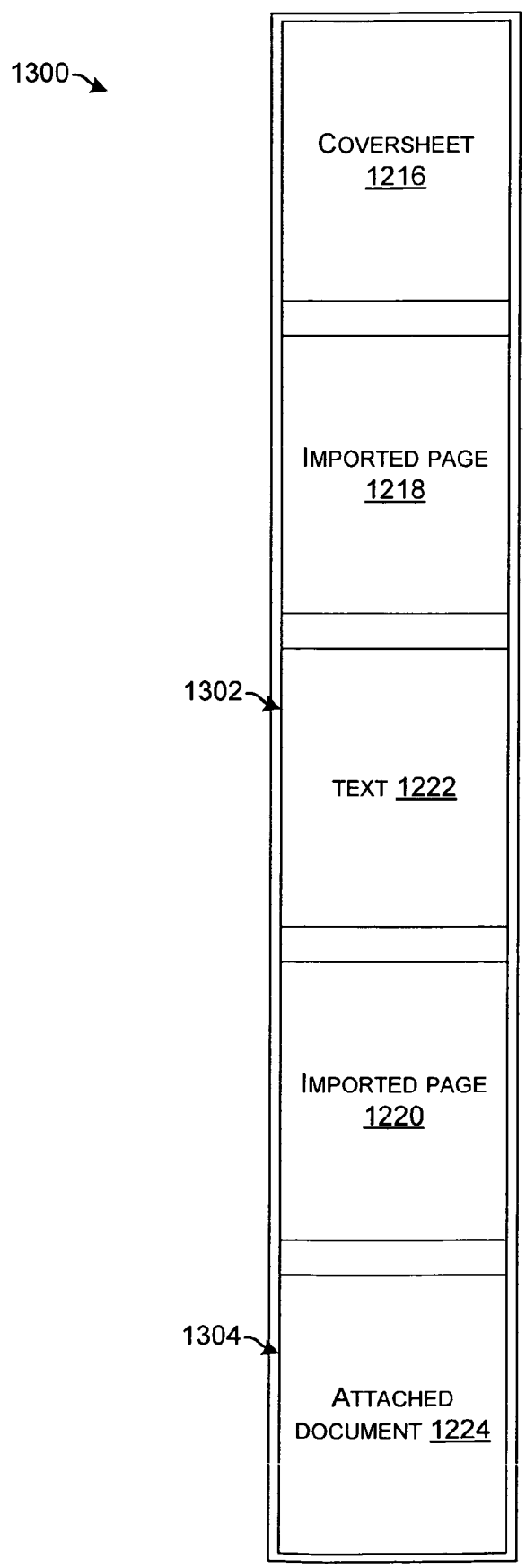

FIG. 13 illustrates a 'Fax preview' 1300 resulting from the fax composition process described in relation to FIG. 12. The 'Fax preview' 1300 represents the fax composition as it would be sent to a fax mechanism configured to send the fax composition. In this instance, a page(s) 1302 is added to accommodate text 1222 and is positioned between imported inline pages 1218 and 1220. Further, attached document 1224 is added after the inline content, and in this particular instance comprises a single page 1304. In this view the user cannot edit the pages and/or the page content and instead returns to the fax composition window to accomplish any further alteration of the fax composition.

In this context, a fax mechanism is any mechanism configured to deliver and/or receive a fax. Examples of fax mechanisms include a PC's local fax modem, a fax modem built in to a connected multi-function peripheral (MFP) device, a Windows® fax server, a Microsoft® Exchange® Server, and/ or a Fax Service Provider (FSP) among others.

Figure 14:
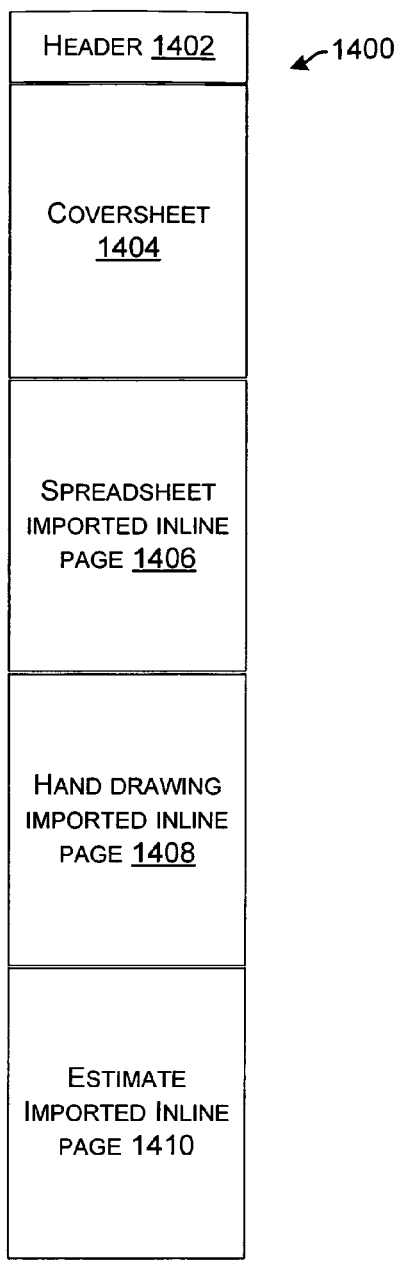

FIG. 14 illustrates a fax composition which provides another example of the enhanced message functionality offered by the present embodiments. In this instance, assume for purposes of explanation that an interior designer wants to fax his or her latest designs to a client. The fax material includes an estimate prepared on a word processing application, a spreadsheet with an itemized breakdown, and a hand drawing. The interior designer locates the spreadsheet with a file browser and selects a command option such as 'send to fax message as inline content'. This command can launch a fax application which generates fax composition window 1400. The fax composition window has a header 1402 followed by an auto-generated coversheet at 1404 which is the first page of inline content. The spreadsheet becomes imported inline page 1406.

Next, the interior designer places the hand drawings on a scanner and selects a command such as 'Insert pages from scanner as inline content' from the header 1402. The hand drawing is imported as imported inline page 1408. The user then remembers the estimate and that he/she wants to sign the estimate. Some implementations can allow the interior designer to create a digitized signature such as with a tablet PC with a touch sensitive screen. Alternatively, the estimate may be printed, signed, and scanned back-in, similar to the hand drawing. In either scenario, assume that the estimate comes in as imported inline page 1410. By being able to see the inline documents as he/she composes the fax, the interior designer decides that the fax wouldn't present well to the client with the potentially boring details of the spreadsheet coming before the drawings. Further the interior designer decides that the hand drawings need further description.

Figure 15:
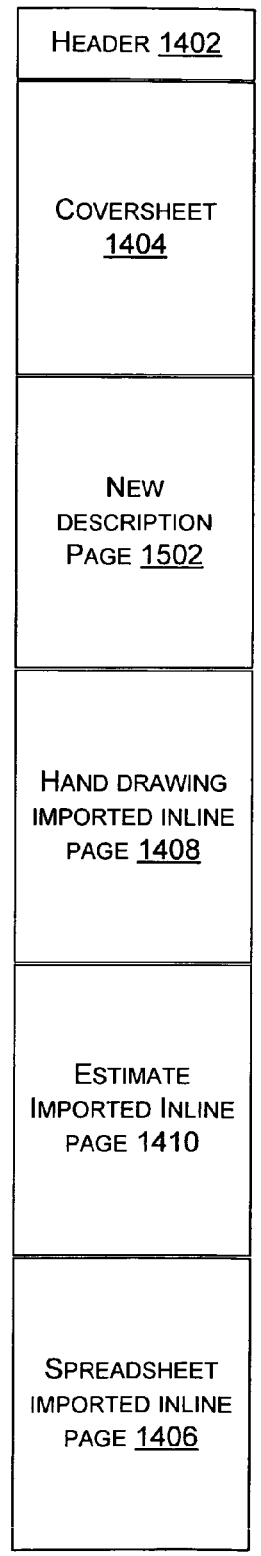

FIG. 15 illustrates an example of some of the exemplary features available to the interior designer. For instance, the interior designer has reordered pages as described above in relation to FIG. 14. Further, the new description is included on page 1502 which is added before the hand drawing imported inline page 1408. The new description can be content composed in the fax composition and/or imported editable content which can be further refined by the interior designer. The interior designer has manipulated the relative order of the imported inline pages so that the spreadsheet on imported inline page 1406 is now the last page of the fax composition.

The examples described in relation to FIGS. 14-15 illustrate imported documents which are only a single page in length due to the physical constraints of the printed page upon which FIGS. 14-15 appear. Though not specifically illustrated, some implementations can group imported pages to enhance the composition options available to the user. For instance, assume in relation to the example provided in FIGS. 14-15 that the imported spreadsheet and imported estimate are multi-page documents rather than single page documents. Some implementations, either automatically and/or responsive to a user request, may group pages as they are imported. For example, the pages of the spreadsheet may be grouped together, and the pages of the estimate may be grouped together. So for instance, assume that the imported spreadsheet includes 10 pages rather than the one illustrated page. If the 10 pages are grouped, the user could drag-and-drop all 10 pages below the estimate to change the relative order of the documents as explained above, rather than having to move each page individually. In various implementations, the user can ungroup and group pages as he or she desires to facilitate the composition process. The user, alternatively or additionally, may be allowed to group pages regardless of which document the pages originally came from. For instance, the user may want to group five pages of the estimate with five pages from the spreadsheet. Some implementations may also track metadata associated with individual pages. So for instance, pages which were imported together as a single document may be able to be identified even after an otherwise confusing amount of user actions such as ungrouping, moving, grouping and more moving, etc.

FIGS. 14-15 provide but one example of how the present embodiments allow a user to manipulate the inter-page relationship of the imported inline pages, and allow the user to add additional content between the imported inline pages. These embodiments allow such user actions while protecting the intra-page integrity of the individual pages, i.e. protecting the content of individual pages.

While FIGS. 14-15 are described in a dedicated fax scenario, at least some of the described implementations can be utilized in unified messaging systems where a user may designate email and/or fax recipients among others. For instance, assume that the interior designer mentioned above wants to send the composed fax to both a husband and a wife at their respective places of employment. Assume further that the husband has access to email but not a fax machine and that the wife has access to a fax machine but not email. At least some implementations can allow the interior designer to compose a single message and to designate the husband as an email recipient and the wife as a fax recipient.

Exemplary Operating Environment

FIG. 16 shows an exemplary computing device that can be used to implement the enhanced document composition features described above and below. Computing device 1642 comprises one or more processors or processing units 1644, a system memory 1646, and a bus 1648 that couples various system components including the system memory 1646 to processors 1644. Threading techniques can be employed on the one or more processors to allow parallel processing of multiple tasks by multiple processing threads.

The bus 1648 represents one or more of any of several types of bus structures, including a memory bus or memory controller, a peripheral bus, an accelerated graphics port, and a processor or local bus using any of a variety of bus architectures. The system memory 1646 comprises read only memory (ROM) 1650 and random access memory (RAM) 1652. A basic input/output system (BIOS) 1654, containing the basic routines that help to transfer information between elements within computing device 1642, such as during start-up, is stored in ROM 1650.

Computing device 1642 can further comprise a hard disk drive 1656 for reading from and writing to a hard disk (not shown), a magnetic disk drive 1658 for reading from and writing to a removable magnetic disk 1660, and an optical disk drive 1662 for reading from or writing to a removable optical disk 1664 such as a CD ROM or other optical media. The hard disk drive 1656, magnetic disk drive 1658, and optical disk drive 1662 are connected to the bus 1648 by an SCSI interface 1666 or some other appropriate interface. The drives and their associated computer-readable media provide nonvolatile storage of computer-readable instructions, data structures, program modules, and other data for computer 1642. Although the exemplary environment described herein employs a hard disk, a removable magnetic disk 1660 and a removable optical disk 1664, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1656, magnetic disk 1660, optical disk 1664, ROM 1650, or RAM 1652, including an operating system 1670, one or more application programs 1672 (such as a user agent or browser), other program modules 1674, and program data 1676. A user may enter commands and information into computer 1642 through input devices such as a keyboard 1678 and a pointing device 1680. Other input devices (not shown) may comprise a microphone, joystick, game pad, satellite dish, scanner, or the like. These and other input devices are connected to the processing unit 1644 through an interface 1682 that is coupled to the bus 1648. A monitor 1684 or other type of display device is also connected to the bus 1648 via an interface, such as video hardware 1686. In addition to the monitor, personal computers typically comprise other peripheral output devices (not shown) such as speakers and printers.

Computer 1642 commonly operates in a networked environment using logical connections to one or more remote computers, such as a remote computer 1688. The remote computer 1688 may be another personal computer, a server, a router, a network PC, a peer device or other common network node, and typically comprises many or all of the elements described above relative to computer 1642. The logical connections depicted in FIG. 16 comprise a local area network (LAN) 1690 and a wide area network (WAN) 1692. Such networking environments are commonplace in offices, enterprise-wide computer networks, intranets, and the Internet.

When used in a LAN networking environment, computer 1642 is connected to the local network through a network interface or adapter 1694. When used in a WAN networking environment, computer 1642 typically comprises a modem 1696 or other means for establishing communications over the wide area network 1692, such as the Internet. The modem 1696, which may be internal or external, is connected to the bus 1648 via a serial port interface 1668. In a networked environment, program modules depicted relative to the personal computer 1642, or portions thereof, may be stored in the remote memory storage device. It will be appreciated that the network connections shown are exemplary and other means of establishing a communications link between the computers may be used.

The computer could also contain analog or digital tuner components 1698. The tuner components can be linked to the system either through an internal or extended bus such as PCI or external bus such as USB bus, IEEE-1694 bus. The tuner components allow the system to receive broadcasting TV through standard TV broadcasting media such as terrestrial, cable, and satellite.

Generally, the data processors of computer 1642 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The system described herein comprises these and other various types of computer-readable storage media when such media contain instructions or programs for implementing the blocks described, in conjunction with a microprocessor or other data processor. The system described can also comprise the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

Exemplary Methods

FIG. 17 represents a method for enhanced document composition features which can be utilized by a user during composition of a message in accordance with one embodiment.

Block 1702 imports user-selected pages into a digital document platform. The user-selected pages may be obtained from various sources such as peripheral devices such as a scanning device, or from internal or external storage devices, such as hard-drives or digital versatile disks (DVDs) among others. In some instances the method calls the native application of the document or otherwise gains access to the document.

Block 1704 protects content of individual user-selected pages while allowing pages to be moved relative to one another and allowing new content to be added between the user-selected pages. Stated another this process protects intra-page content of the pages while allowing an inter-page relationship of the plurality of pages to be manipulated by a user. After the method obtains the document, the content of individual pages can be protected by further processing predicated on the native format of the document. For instance, if the native format stores the document as bit-map pages then the document can be imported without further processing and displayed for the user as imported inline pages. Otherwise, the method may process the document into a bit-map or other suitable format which protects the integrity of the content of individual imported inline pages prior to presenting the pages to the user.

In some implementations, the imported inline pages are presented in a composition window. The imported inline pages are visible to the user during the composition process but the content of individual imported inline pages is protected from user manipulation. The imported inline pages being visible during the composition process contributes to a rich composition experience for the user. Further, while the content of the individual imported inline pages is protected the user can otherwise utilize a full range of composition features. For instance, in at least some implementations, the user can add content, such as comments, between the imported inline pages. Further, the user can rearrange the imported inline pages while maintaining the integrity of the individual imported inline pages. Still further the user can also import editable content, such as by dragging-and-dropping, cutting-and-pasting, and/or importing editable documents. In these implementations, the user can utilize other editing features, such as spell checking, on the editable content.

CONCLUSION

The described embodiments provide for enhanced document composition features which can be utilized by a user during composition of a message. At least some of the features relate to allowing a user to import pages inline into a composition window such that individual pages are protected from manipulation, while otherwise enabling a rich composition experience for the user.

Various examples which can contribute to enhanced document composition features are described above in relation to the Windows Outlook brand email/messaging product for use on the Windows brand operating system. Other implementations may be generated on various other messaging applications for use on the Windows brand operating system and/or other operating systems such as Linux, and Mac OS, among others.

Although embodiments relating to techniques contributing to enhanced document composition features have been described in language specific to structural features and/or methods, it is to be understood that the subject of the appended claims is not necessarily limited to the specific features or methods described. Rather, the specific features and methods are disclosed as exemplary implementations which contribute to enhanced document composition features.

The invention claimed is:

1. A computer-implemented method comprising computer-executable instructions, the method comprising:
    invoking a message composition window on a computing device;
    enabling a user, via the message composition window, to select a desired document for importation into a message body of a fax which the user is composing;
    responsive to the user selecting the desired document, accessing, via the message composition window, the document, wherein the accessing is performed by a page integrity document sharing mechanism and comprises:
        obtaining the document from a native application;
        rasterizing the document into bit-mapped pages; and
        importing rendered pages of the desired document into the message body such that content of the imported individual pages is protected while allowing the user to add content between individual pages, wherein the added content is composed content using at least one of typing on a keyboard, a drag-and-dropping text, images, graphics, and a cutting-and-pasting, wherein the imported individual pages are a sub-set of a file; and
    tracking metadata associated with the document.

2. The method as recited in claim 1, wherein the importing comprises importing the individual pages so that content of individual pages is visible to the user within the message body.

3. The method as recited in claim 1, wherein the enabling comprises allowing the user to select the desired document from at least one of a plurality of command options exposed on a user-interface.

4. The method as recited in claim 1, wherein the user can manipulate the relative order of the imported pages within the message body.

5. The method as recited in claim 1, wherein the rasterizing is accomplished by a fax application.

6. The method as recited in claim 1, wherein the rasterizing is accomplished by a print driver.

7. One or more computer-readable storage media having computer-readable instructions which, when executed, implement a method, comprising:
    importing user-selected pages into a digital document platform utilizing page integrity document sharing mechanism, wherein the importing comprises:
        calling a native application which generated the user-selected pages and converting the user-selected pages into bit maps prior to importing the user-selected pages into the digital document platform as imported inline content; and
        grouping the user-selected pages, the user-selected pages originating from more than one native application;
    tracking metadata associated with each of the user-selected pages; and
    protecting content of imported individual user-selected pages while allowing the imported individual user-selected pages to be moved relative to one another and allowing new content to be added between the imported individual user-selected pages, wherein the new content is composed content using at least one of typing on a keyboard, a drag-and-dropping text, images, graphics, and a cutting-and-pasting, wherein the imported individual user-selected pages are a sub-set of a file.

8. The computer readable media as recited in claim 7, wherein the digital document platform comprises one or more of: a fax application, an email application, and a unified fax and email application.

9. The computer readable media as recited in claim 7, wherein the importing comprises calling a native application which generated the user-selected pages and converting the user-selected pages into bit-maps prior to importing the user-selected pages into the digital document platform as imported inline content.

10. The computer readable media as recited in claim 7, wherein the protecting comprises:
    accessing the user-selected pages in a native format; and,
    sending the user-selected pages to a printer driver to be rasterized.

11. A system, comprising:
    a system memory;
    a processor coupled to the system memory;
    means for importing a plurality of pages into a digital document platform, wherein the digital document platform comprises at least one of a page integrity document sharing mechanism and a content destination;
    means for maintaining intra-page content of the plurality of pages while allowing an inter-page relationship of the plurality of pages to be manipulated by a user, wherein the means for maintaining comprises the page integrity document sharing mechanism configured to rasterize individual pages into a bit-map before importing the pages into the digital document platform as imported inline pages; and means for tracking metadata associated with the plurality of pages in the digital document platform.

12. The system as recited in claim 11, wherein the means for maintaining is configured to cause the plurality of pages to be exported from a native application to a print driver for conversion into a non-native format such that content of individual pages cannot be manipulated by the user.

13. The system as recited in claim 11, wherein the plurality of pages comprise a file.

14. The system as recited in claim 11, wherein the means for importing comprises one or more of: a fax application, an email application, and a unified email and fax application.

15. The system as recited in claim 11, wherein the means for importing is configured to create a message composition window and to import the plurality of pages into the message composition window as imported inline pages such that the individual pages are viewable to the user in the message composition window.

* * * * *